United States Patent
Kollar

[15] 3,705,447
[45] Dec. 12, 1972

[54] MACHINE TOOL BIT
[72] Inventor: John P. Kollar, Trumbull, Conn.
[73] Assignee: Thomas J. Kollar, Milford, Conn.
[22] Filed: Oct. 22, 1970
[21] Appl. No.: 83,067

[52] U.S. Cl. ..........................................29/95, 29/96
[51] Int. Cl. ...............................................B26d 1/00
[58] Field of Search........29/95, 96, 97, 98, 102, 105, 29/105 A

[56] References Cited

UNITED STATES PATENTS

| 3,557,417 | 1/1971 | Kollar | 29/96 |
| 471,674 | 3/1892 | Loveland et al. | 29/102 X |
| 104,055 | 6/1870 | Munro et al. | 29/105 X |
| 1,838,520 | 11/1929 | Archer | 29/98 |
| 2,289,344 | 7/1942 | Cedarleaf | 29/102 |
| 2,381,485 | 8/1945 | Chapman | 29/96 |

FOREIGN PATENTS OR APPLICATIONS

| 1,200 | 3/1894 | Great Britain | 29/105 |
| 1,092,708 | 11/1967 | Great Britain | 29/96 |
| 3,248 | 10/1873 | Great Britain | 29/96 |

Primary Examiner—Harrison L. Hinson
Attorney—Johnson & Kline

[57] ABSTRACT

There is disclosed a single end, full radius, contouring and disposable machine tool bit having on its cutting end cutting edges comprising a centralized semicircular segment which is larger in diameter than the width of the body of the bit for cutting work during its forward and lateral movements and means for cutting the work during the retrograde movements of the bit including an arcuate segment which is a continuation of said semicircular segment at each end of the latter for about 10° and a straight segment forming a continuation of each of said arcuate segments extending toward and forming an included angle of about 60° with the longitudinal axis of the body of the bit.

4 Claims, 6 Drawing Figures

PATENTED DEC 12 1972 3,705,447
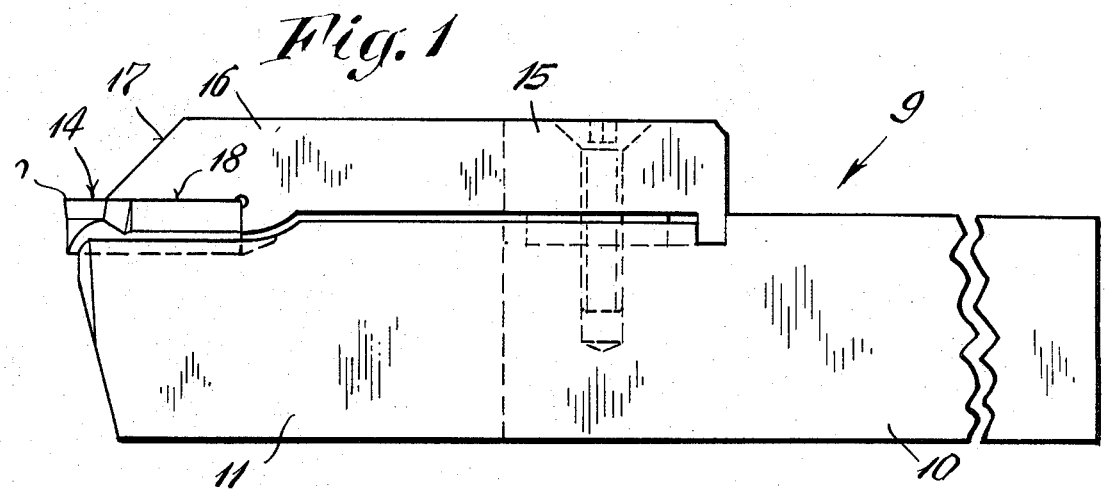
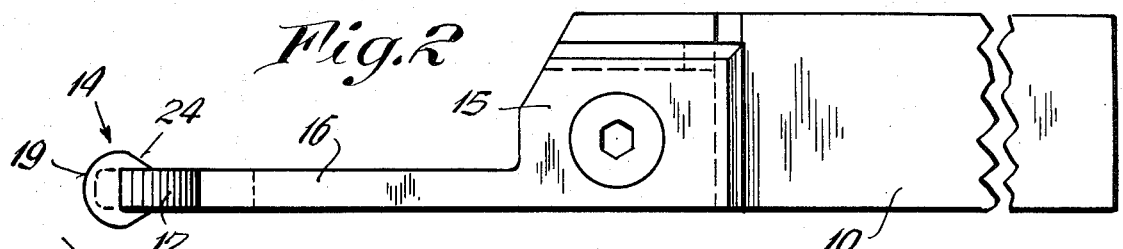
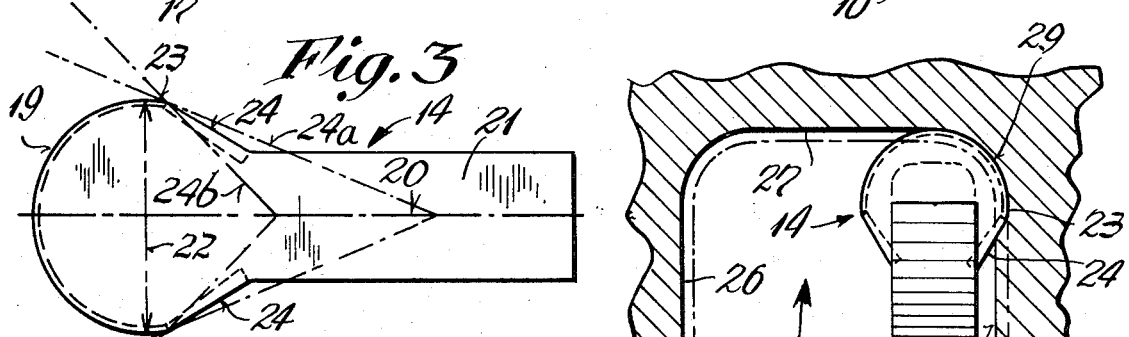
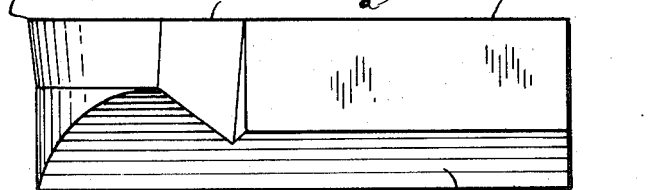
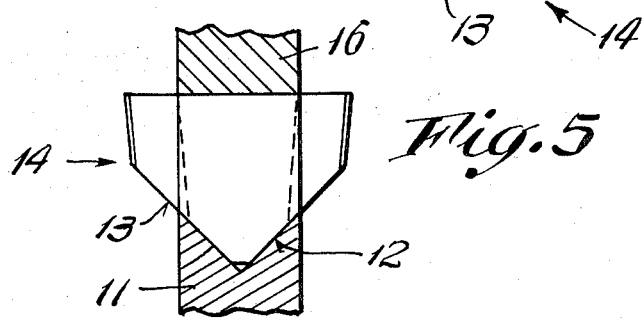
INVENTOR.
John P. Kollar
BY
Johnson and Kline
ATTORNEYS

MACHINE TOOL BIT

This invention relates to a single end disposable machine tool bit particularly adapted for contouring or tracing operations.

Such bits, or inserts as they are sometimes called, are intended to be mounted for use on a shank secured to a tool holder or post of a lathe or the like.

In tracing operations, the bit is advanced into a groove in the work along one wall of the groove to finish-cut that wall and then is fed along the bottom of the groove until the opposite wall of the groove is reached. Heretofore in such operations particularly, in order to finish-cut the second wall of the groove, the bit was backed-off the work so that it cleared said second wall. The bit was then withdrawn from the groove and reindexed to align the cutting edge of the bit with the wall to be finish-cut. Then the bit was advanced along and cut the second wall. This was necessary because bits as heretofore made were not capable of cutting the work during the forward, lateral and retrograde passes over the work.

It is an object of the present invention to provide an improved bit so that, in tracing operations for instance, at the end of the axial cut in a piece of rotating work, which is usually more or less parallel to the axis of the work, the bit in its return or retrograde movement will finish-cut the adjacent side of the recess as the bit is being withdrawn from the groove.

This is accomplished, according to the present invention in its presently preferred form, by providing the working end of the bit with a semicircular cutting surface segment, an arcuate segment which extends in continuation of the semicircular segment for approximately 10° on each side of the latter, and a straight cutting segment forming a continuation of said arcuate segment which extends toward the axis of the bit and forms an included angle of between 22° and 45°, preferably 30° with the line of retrograde movement of the bit which is usually parallel with the longitudinal axis of the bit. If the withdrawal of the bit is to be only from one side of the groove in the work, only one arcuate segment and one companion straight segment need be provided.

With these cutting segments provided with a relief angle of about 7°, it has been found that at the end of an axial cut, the bit when being withdrawn will finish-cut the second, i.e. adjacent, side of the recess, thus effecting a substantial saving in time and labor.

Other features and advantages will hereinafter appear.

In the accompanying drawings

FIG. 1 is a side elevation of the front end of a bit-holding shank showing a bit of the present invention secured thereto.

FIG. 2 is a plan view of the bit and shank shown in FIG. 1.

FIG. 3 is an enlarged plan view of the bit of the present invention.

FIG. 4 is a side view of the bit shown in FIG. 3.

FIG. 5 is an end view of the bit shown in FIGS. 3 and 4 looking at the back end of the bit.

FIG. 6 is a schematic view illustrating the position of the bit at the end of an axial cut in tracing a recess in a piece of work and before the bit is retracted to finish-cut the adjacent edge of the recess.

As shown in FIGS. 1 and 2, the tool shank 9 has a body portion 10 adapted to be supported in a tool holder of a lathe or the like. The shank 9 has a narrow blade 11 integral with and extending beyond the forward end of the body portion 10. The blade 11 has on its upper surface a V-shaped groove 12 adapted to receive a V-formation 13 on an insertable and removable tool bit 14.

Superposed on the shank body 10 is a clamp 15, and this is positioned so that a blade 16 integral with the clamp 15 is vertically aligned with the blade 11 on the shank.

As will be seen from FIG. 1, the clamp blade 16 at its front end has a sloping face 17 to provide for chip clearance and has a flat horizontal surface 18 which engages a substantial portion of the flat top surface of the tool bit 14 centered by the V-groove 12 in the blade 11 when the clamp 15 is secured to the body 10 by a screw 10a.

For the particular form of shank 9 and clamp 15 shown herein, the bit 14 is usually made of carboloid and is made as short, narrow and thin as possible considering the use to which it is put because the carboloid casting from which the bit is made is expensive. In such cases cost is an important factor because the bits are usually discarded when they become dull, it having been found that the labor involved in regrinding and honing the bits exceeding the cost of new bits which can be ground and honed on a mass production basis.

The shank 9 and bit 14 are indexed to cutting position relative to the workpiece and are advanced into the workpiece, then axially along the workpiece and retracted from the workpiece by the usual mechanism of a lathe or other machine tool.

In contouring or tracing operations for instance, in finishing a rough cut or cast formed groove in a cylindrical body using a bit having a semicircular cutting edge, it was heretofore necessary at the end of the axial cut to back the bit off the work idly before withdrawing the bit from the workpiece. This was because of the absence of any cutting edge at the end of the semicircular cutting edge to remove the material lying between the widest part of the semicircular cutting edge and the body of the bit. As a result, after the bit is withdrawn from the groove, it must be reindexed to the proper point and advanced into the work to finish-cut the adjacent wall.

According to the present invention, these operations of backing-off the bit, withdrawing the bit, reindexing the bit and advancing it are obviated, it being merely necessary at the end of the axial cut in the recess to withdraw the bit and at the same time finish-cut the adjacent side wall of the recess.

To accomplish this result, the bit according to the present invention is provided with a semicircular cutting edge 19 which preferably is centered on the longitudinal axis 20 of the bit body 21, and has a diameter 22 which is greater than the width of the bit body 21. In addition, the cutting edge of the bit has an arcuate segment 23 extending in continuation of the semicircular edge 19 beyond the diameter 22 of the latter at each end thereof for about 10° and in continuation of the segment 23 a straight edge segment 24 which extends toward the body portion 21 and preferably forms an included angle of about 30° with the line of the retrograde movement of the body which is usually parallel with the axis 20 of the bit body. While it is usually preferable in most situations to have the angle of the straight segment form an included angle of 30° with the direction of retrograde movement of the bit but depending on the material being cut and the speed of the cutting, the included angle may be between about 22° and about 45° as indicated in FIG. 3 by the dotted lines 24a and 24b respectively.

Thus, in tracing a groove 25, for instance as shown in FIG. 6, the bit 14 is indexed to the proper position and advanced to take a finish-cut along a wall 26 of the groove 25 until it reaches the desired depth. The bit is then traveled generally parallel to the axis of the workpiece to finish-cut the surface 27 to the other side of the groove 25 and to the wall 28 which is then undercut at 29. Then the bit is retracted from the groove at which time the segments 23 and 24 cut away the unfinished material as indicated in the drawing. Sufficient relief, of course, is provided for the cutting edges 19, 23 and 24.

The differences between the diameter 22 of the semicircular segment 19 and the width of the body 21 of the bit, and the length of the segments 23 and 24 depend, of course, on the maximum depth of the cut to be made in the all 28 during the retraction of the bit.

It will be appreciated from the above that, in contouring a recess with the bit of the present invention, four adjusting movements of the bit heretofore necessary are eliminated, i.e. backing-off the bit, retracting the bit, reindexing the bit and readvancing the bit.

It will be understood by those skilled in the art that the recess or groove in the workpiece to be traced need not have a straight line bottom. It may, for instance, be arcuate or undulating.

It will also be understood that the blade 16 of the clamp and the blade 11 of the shank should not be appreciably wider than the body portion of the bit and should be long enough to enter cuts of desired depths in the workpiece without interference from the clamp and the shank.

It is most desirable to make the cutting edges of the bit symmetrical about the longitudinal axis 20 of the bit so that the withdrawing cut may be made either at the right or left wall of the groove, depending on the direction in which the axial cut in the work is to be made. However, if this convenience is not desired, either the right side or the left side segments 23 and 24 may be omitted without departing from the spirit of this invention.

Variations and modifications may be made within the scope of the claims and portions of the improvements may be used without others.

I claim:

1. A cutting bit for a machine tool comprising an elongate body portion having on its end cutting edges comprising a semicircular cutting segment having a diameter larger than the width of its body portion for cutting work during the forward and lateral movements of the bit relative to the work and means for cutting work during the retrograde movement of the bit relative to the work comprising at least one arcuate cutting segment forming a continuation of said semicircular cutting segment at an end thereof for about 10°, and a straight cutting segment forming a continuation of said one arcuate cutting segment and forming an included angle of between 22° and 45° with the line of retrograde movement of the bit.

2. A cutting bit as defined in claim 1, in which said one straight cutting segment forms an included angle of about 30° with the line of retrograde movement of the bit.

3. A cutting bit as defined in claim 1, in which the means for cutting work during the retrograde movement comprises two arcuate cutting segments each forming a continuation of said semicircular cutting segment, one at each end thereof for about 10°, and a straight cutting segment forming a continuation of each arcuate cutting segment and forming an included angle of between 22° and 45° with the line of retrograde movement of the bit.

4. A cutting tool as defined in claim 3, in which each of said straight cutting segments forms an included angle of about 30° with the line of retrograde movement of the bit.

* * * * *